April 21, 1931. E. T. PARSONS 1,801,286
LOAF MOLDER FEEDING DEVICE
Filed Oct. 28, 1929 4 Sheets-Sheet 2

INVENTOR
Edward T. Parsons,
BY
Everett H. Cook,
ATTORNEYS

April 21, 1931.    E. T. PARSONS    1,801,286
LOAF MOLDER FEEDING DEVICE
Filed Oct. 28, 1929    4 Sheets-Sheet 4

INVENTOR
Edward T. Parsons,
BY
ATTORNEYS

Patented Apr. 21, 1931

1,801,286

UNITED STATES PATENT OFFICE

EDWARD T. PARSONS, OF UPPER MONTCLAIR, NEW JERSEY, ASSIGNOR TO THOMSON MACHINE COMPANY, A CORPORATION OF NEW JERSEY

LOAF-MOLDER-FEEDING DEVICE

Application filed October 28, 1929. Serial No. 402,818.

This invention relates in general to apparatus for feeding lumps or balls of dough to a loaf molding machine, the apparatus being designed to receive the balls of dough direct from the discharge chute of a proofing apparatus or by manual depositing of the balls of dough upon the feeding apparatus.

One object of the invention is to provide a loaf molder feeding apparatus of the character described so constructed and combined with a loaf molding machine that the possibility of injury to the hands of operators by being caught between the sheeting rollers of the molding machine is materially reduced.

Another object is to provide apparatus for feeding lumps or balls of dough to a loaf molding machine embodying novel and improved features of construction whereby the lump of dough is accurately deposited in the proper relation to the sheeting rollers so that perfect sheeting of the dough is insured.

Other objects are to provide apparatus of the character described embodying novel and improved means for preliminarily flattening the lump of dough immediately before it is presented to the sheeting rollers, whereby the sheeting operation is facilitated; to provide such apparatus whereby the possibility of "doubles" or the attachement of one lump to another, as the lumps are fed to the molding machine, is obviated, and to obtain other advantages and results as will more fully appear from the following description.

Referring to the accompanying drawings in which corresponding and like parts are designated by the same reference characters throughout the several views.

Figure 1:
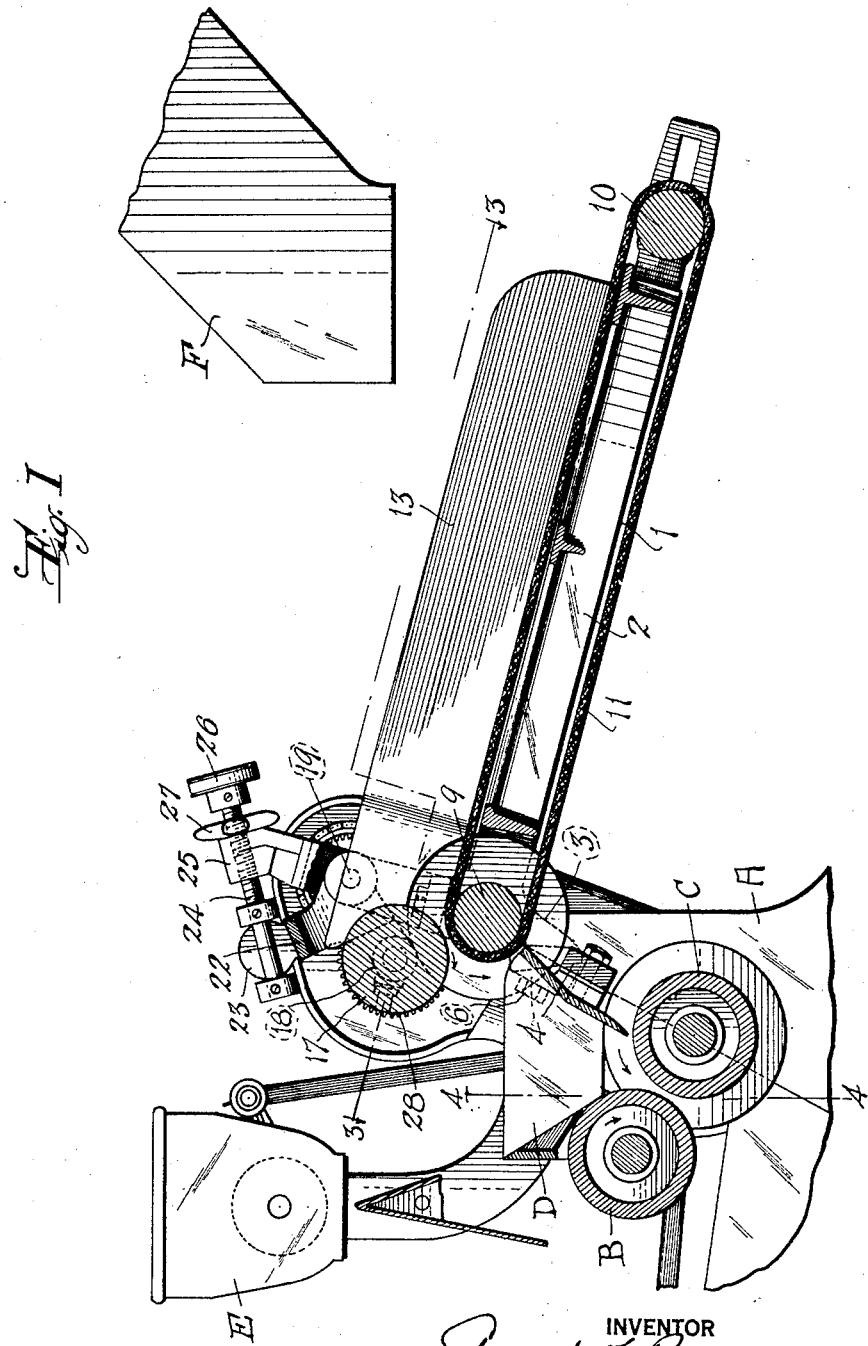
Figure 1 is a vertical longitudinal sectional view through a loaf molder feeding apparatus embodying my invention, showing it attached to a loaf molder of known construction which is fragmentarily illustrated.
Figure 2:
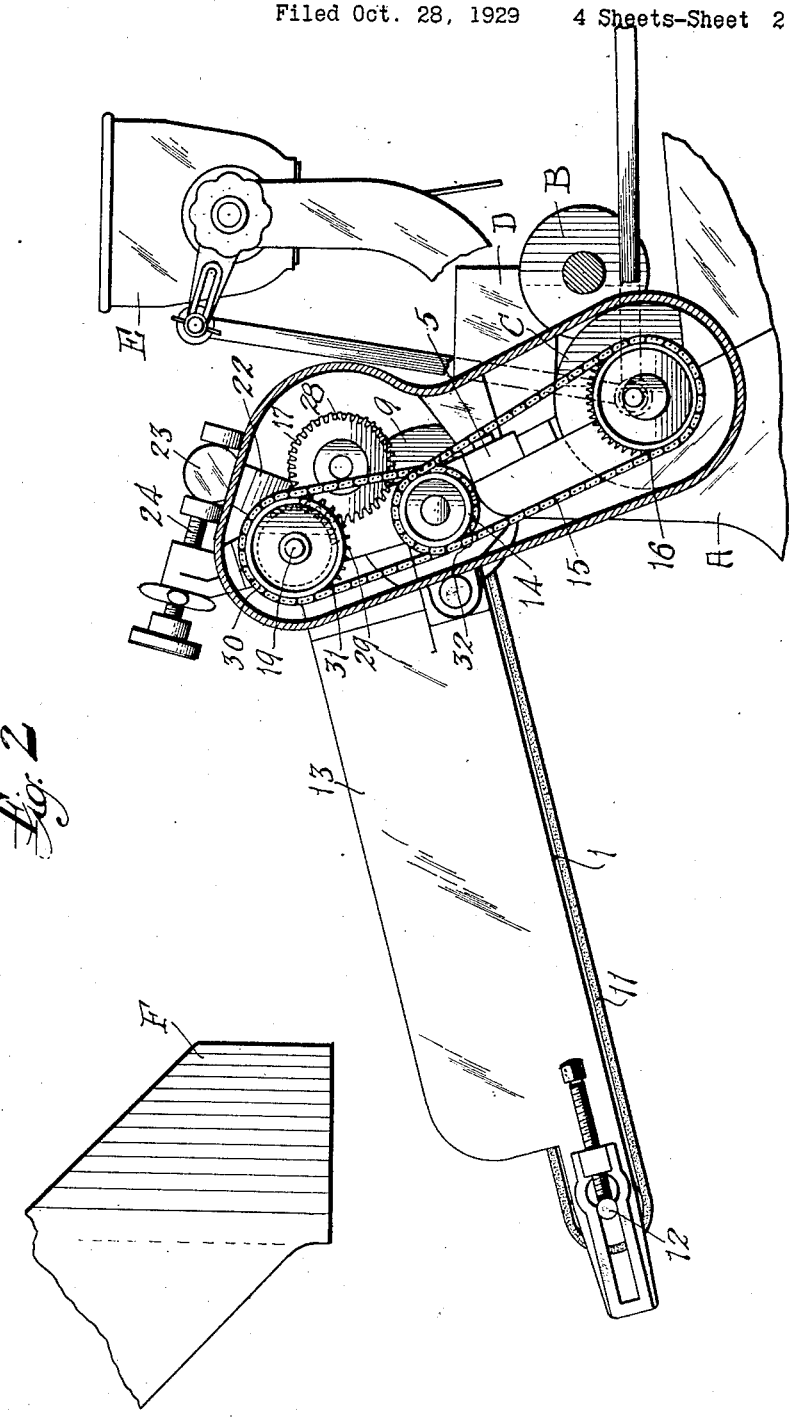
Figure 2 is a side elevation of the apparatus viewed from a position at 180 degrees to that of Figure 1, portions of the gear guard being shown in section.
Figure 3:
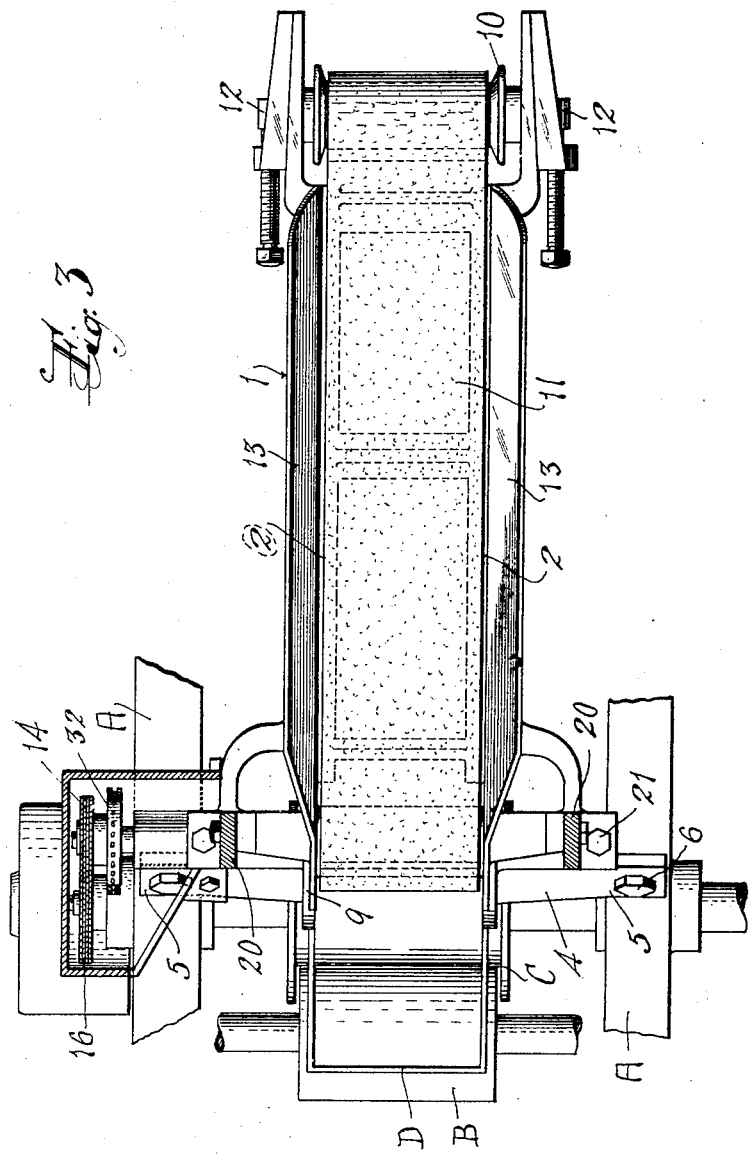
Figure 3 is a top plan view of the apparatus taken on the line 3—3 of Figure 1.
Figure 4:
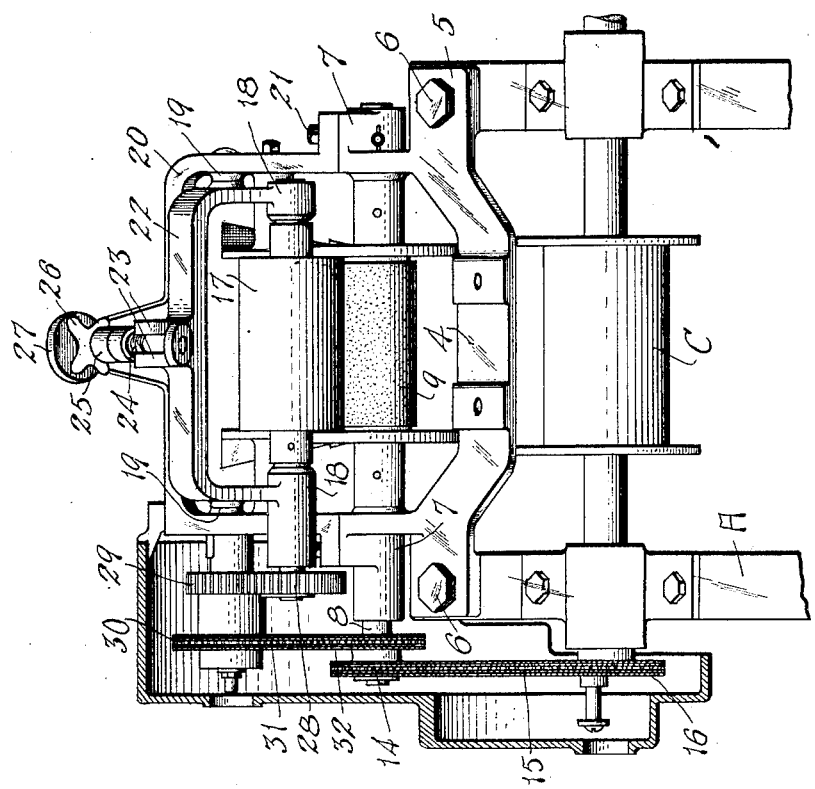
Figure 4 is an elevation of the apparatus taken on the line 4—4 of Figure 1, with portions of the dough molding machine omitted for clearness in illustration.

Specifically describing the illustrated embodiment of the invention the reference character A designates the frame of a loaf molding machine of known construction which has at its upper ends a pair of sheeting rollers B and C which are driven in the direction indicated by the arrows by any suitable driving mechanism (not shown) and are adapted to receive between them from a hopper D, a lump or ball of dough from which a loaf is to be formed. The lump is sheeted between the rollers B and C and afterward spirally rolled and kneaded into a loaf with apparatus well known to those skilled in the art. A flour duster E of any suitable construction is mounted upon the frame A to supply flour dust to the sheeting rollers.

The feeding device embodying my invention comprises a frame 1 consisting of spaced and parallel sides 2 which at one end have depending arms 3 connected to a cross bar 4. The extremities 5 of the cross bar are formed with openings to receive bolts 6 for securing the frame to the main frame A of the loaf molding machine with the frame 1 inclined downwardly away from the hopper D.

Said end of the frame 1 also has bearings 7 in which is journaled a transverse shaft 8 carrying a flanged roller 9; and over this roller and another roller 10 at the opposite end of the frame 1 is arranged to travel an endless canvas belt 11. The roller 10 is mounted in adjustable bearings 12 by which the tension of the belt 11 may be adjusted. The sides 2 of the frame 1 have upwardly extending parallel longitudinal flanges 13 which form side guides for the conveyor belt. One end of each of the flanges 13 partially overlies one of the flanges of the flanged roller 9 so as to form in effect continuations thereof.

The flanged roller 9 is shown as driven in the direction indicated by the arrow, by a sprocket 14 on the end of the shaft 8 which is connected by a chain 15 to another sprocket 16 on the shaft of the sheeting roller C, which as before described is driven by any suitable known means. With this construction it will be observed that a lump of dough which may be placed upon the conveyor belt 11 at the outer end of the frame 1 adjacent the roller 10 will be conveyed by the belt upwardly to the flanged roller 9, and from there deposited by gravity into the hopper D, and thence between the sheeting rollers B and C. The relation of the flanged roller 9 to the hopper D is such that the lump will be accurately deposited in exactly the right relation to the sheeting rollers. Therefore there is little or no reason for the operator to insert his hands into the space adjacent the sheeting rollers and thus sustain injury, since he may deposit the lump of dough freely and without danger upon the conveyor which then completes the feeding operation.

In accordance with the invention means is also provided for preliminarily flattening the lump or ball of dough before it is deposited in the hopper D. This means also prevents "doubles" being formed. As shown said means comprises a roller 17 journaled on trunnions in arms 18 which are pivoted at 19 to an inverted U-shaped superframe 20 which bridges the conveyor belt 11 and is bolted or otherwise secured at 21 to the sides 2 of the frame 1. The arms 18 are connected by a yoke 22 so as to move simultaneously about their pivots 19. The arms 18 are arranged to be swung about their pivots so as to vary the distance of the roller 17 from the flanged roller 9, and for this purpose I have shown the yoke 22 provided with spaced lugs 23 between which is swiveled one end of an adjusting screw 24, the other end of which is threaded in a boss 25 on the superframe 20. A thumb nut 26 is provided for rotating the screw and a lock nut 27 serves to lock the screw in adjusted position. Obviously by rotating the screw 24 in one direction or the other roller 17 may be moved toward or away from the flange roller 9.

It is desirable to drive the roller 17 and for this purpose the trunnions of the roller may have connected thereto a gear 28 which meshes with a gear 29 journaled concentric with one of the pivots 19 and fast connected to a sprocket 30 which is in turn connected by a chain 31 to a sprocket 32 on the shaft 8 of the flange roller 9. Swinging of the roller 17 about the pivots 19 as an axis the gears 28 and 29 will always be in proper mesh.

In operation, depending upon the size of the lumps of dough, the roller 17 is adjusted a certain distance away from the flange roller 9 so as to produce a flattening effect upon the lump of dough as it passes between said rollers. Should one lump of dough fall upon another, the uppermost lump will be displaced by engagement with the roller 17 so that the possibility of "doubles" is obviated.

The outer end of the frame 1 may be disposed beneath the discharge chute F of a proofing apparatus so that the lumps of dough fall directly upon the conveyor belt from said chute and are carried to the dough molding machine. It is known that the lumps of dough fall at irregular intervals from the proofing machine, and my said apparatus compensates for this irregular feeding and avoids the possibility of two lumps of dough falling from the chute F into the space between the sheeting rolls at the same time, as is now possible where the discharge chute F is disposed directly over the hopper.

While I have shown and described the invention as embodied in certain details of construction it will be understood that this is primarily for illustrating the principles of the invention and that many modifications and changes may be made in the machine without departing from the spirit or scope of the invention.

Having thus described my invention, what I claim is:

1. The combination with the sheeting rolls of a loaf molding machine, of feeding apparatus comprising a conveyor frame mounted with one end adjacent and above said sheeting rolls, a roller at each end of said conveyor frame one adjacent and above said sheeting rolls, an endless belt mounted to run on said rollers to convey a lump of dough to and deposit it between said sheeting rolls, means for driving said conveyor belt, a super-frame mounted on said conveyor frame in bridging relation to said conveyor belt, and a third roller journaled in said super-frame in spaced and parallel relation to the first-mentioned roller to cooperate with the latter in flattening the lump of dough before it passes to said sheeting rolls.

2. The combination with the sheeting rolls of a loaf molding machine, of feeding apparatus comprising a conveyor frame mounted with one end adjacent and above said sheeting rolls, a roller at each end of said conveyor frame one adjacent and above said sheeting rolls, an endless belt mounted to run on said rollers to convey a lump of dough to and deposit it between said sheeting rolls, means for driving said conveyor belt, a super-frame mounted on said conveyor frame in bridging relation to said conveyor belt, a yoke journaled on said super-frame above said conveyor belt, a third roller journaled in said yoke in spaced and parallel relation to the first-mentioned roller, and means for adjusting said yoke to move said third roller toward and from the first-mentioned roller.

3. The combination with the sheeting rolls of a loaf molding machine, of feeding apparatus comprising a conveyor frame mounted with one end adjacent and above said sheeting rolls, a roller at each end of said conveyor frame one adjacent and above said sheeting rolls, an endless belt mounted to run on said rollers to convey a lump of dough to and deposit it between said sheeting rolls, means for driving said conveyor belt, a super-frame mounted on said conveyor frame in bridging relation to said conveyor belt, a yoke journaled on said super-frame above said conveyor belt, a third roller journaled in said yoke in spaced and parallel relation to the first-mentioned roller, means for adjusting said yoke to move said third roller toward and from the first-mentioned roller, and means for rotating said third roller.

EDWARD T. PARSONS.